Nov. 25, 1930.  D. G. ROOS  1,782,513
INTERNAL COMBUSTION ENGINE
Filed Feb. 20, 1928  2 Sheets-Sheet 1

INVENTOR.
Delmar G. Roos
BY
P. W. Pomeroy
ATTORNEY

Nov. 25, 1930.  D. G. ROOS  1,782,513
INTERNAL COMBUSTION ENGINE
Filed Feb. 20, 1928    2 Sheets-Sheet 2

INVENTOR.
Delmar G. Roos
BY
P. W. Pomeroy
ATTORNEY

Patented Nov. 25, 1930

1,782,513

UNITED STATES PATENT OFFICE

DELMAR G. ROOS, OF SOUTH BEND, INDIANA, ASSIGNOR TO THE STUDEBAKER CORPORATION, OF SOUTH BEND, INDIANA, A CORPORATION OF NEW JERSEY

INTERNAL-COMBUSTION ENGINE

Application filed February 20, 1928. Serial No. 255,670.

This invention relates to internal combustion engines and particularly to the cooling fans therefor. Heretofore, internal combustion engines have used cooling fans which were positively driven by the engine to operate at all speeds thereof.

It has been found that the fan is not needed above certain engine speeds because of the fact that the wind passing through the radiator is sufficient to cool the engine. Taking for example, an engine which has an approximate maximum speed of 3800 revolutions per minute, it has been found that fan cooling is required for speeds below forty-five miles per hour, but above that speed it is not necessary to use the fan. Forty-five miles per hour is equivalent in the engine taken for example to approximately 2000 revolutions per minute. For this engine there are a number of disadvantages in using a positive drive fan at speeds above 2000 revolutions per minute. At 2000 revolutions per minute it requires approximately 3 horsepower to drive the fan and at 3800 revolutions per minute it requires between 10 and 12 horsepower to drive the same. By cutting out the fan at 2000 revolutions per minute, the entire 10 or 12 horsepower is saved which can be used to great advantage at speeds above 45 miles per hour, both in economy of operation and in increased efficiency. Another disadvantage encountered is that the fans are noisy at the higher speeds. Still another disadvantage encountered in positive drive fans driven above an engine speed of 2000 revolutions per minute, is the breakage of the fan driving belts. It has been stated before that it requires about 10 horsepower to drive the fan when the engine is running at 3800 revolutions per minute and the forces absorbed by the fan belt at this speed are so large that they soon cause the fan belt to break. It is therefore, the principal object of this invention to provide an internal combustion engine with a cooling fan which will be inoperative at a predetermined engine speed in order to eliminate the disadvantages previously mentioned.

Another object is to provide an internal combustion engine with a centrifugal fan which will be automatically disconnected from the engine at a predetermined speed thereof.

A further object is to provide an internal combustion engine with a cooling fan comprising freely rotatable fan blades, driving mechanism therefor and means for disconnecting the fan from the driving mechanism at a predetermined engine speed consisting of a drum secured to said fan, a pair of weighted pivotally supported arms engageable with the drum, and spring normally holding the arms in contact with the drum, the weighted ends of the arms being thrown outwardly by centrifugal forces at a predetermined engine speed to disconnect the driving means from the drum.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a side elevation of an internal combustion engine having a centrifugally actuated fan assembled thereto.

Figure 1:
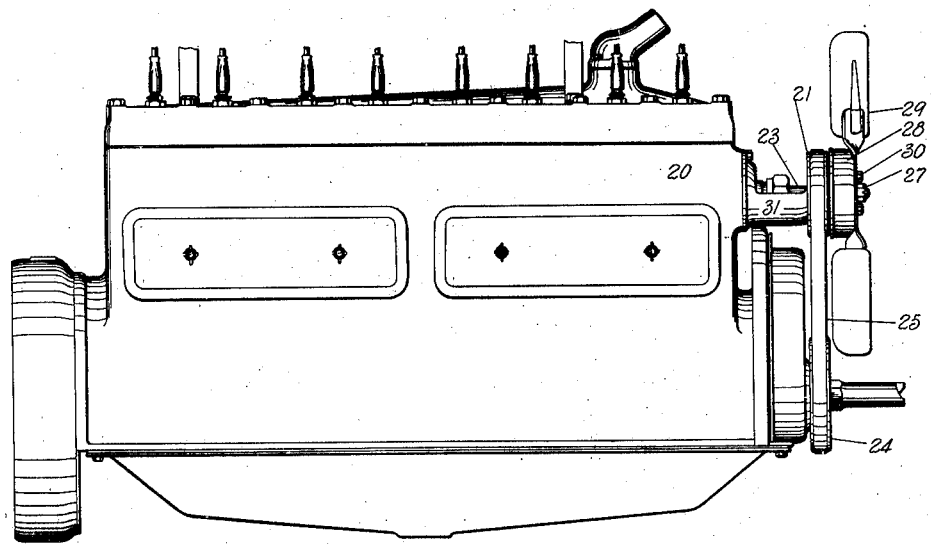

Referring to the accompanying drawings in which like numerals refer to like parts throughout the several views, the internal combustion engine 20 shown in Figure 1 is of the conventional type having a fan for cooling the same. The fan is driven by a pulley 21 secured by a key 22 or other suitable means to a rotatable shaft 23. The shaft 23 may be utilized to drive the water circulating pump and is journaled in a bracket 31 secured to the engine 20. The fan pulley 21 is preferably driven through the medium of a belt 25 by means of a pulley 24 rigidly secured to the forward end of the engine crankshaft.

It is desirable that no positive connection be provided between the fan blade assembly 29 and the driving shaft 23 in order that the fan may be free to rotate at certain speeds independently of the speed of the shaft 23. The fan blade assembly 29 is provided with a concentric drum 28, similar to a brake drum, secured thereto by suitable screws 30 threaded into the hub 32 of the drum. The hub 32 of the drum 28 telescopically receives a ball bearing 26 which is rotatably mounted upon the end of the shaft 23 projecting past the hub of the fan pulley 21. A nut 27 threaded on the end of the shaft 23 and a spacer washer 33 prevents movement of the fan blades 29 longitudinally of the shaft 23 and firmly forces the non-rotatable portion of the ball bearing race against the hub of the fan pulley 21.

Figure 2:
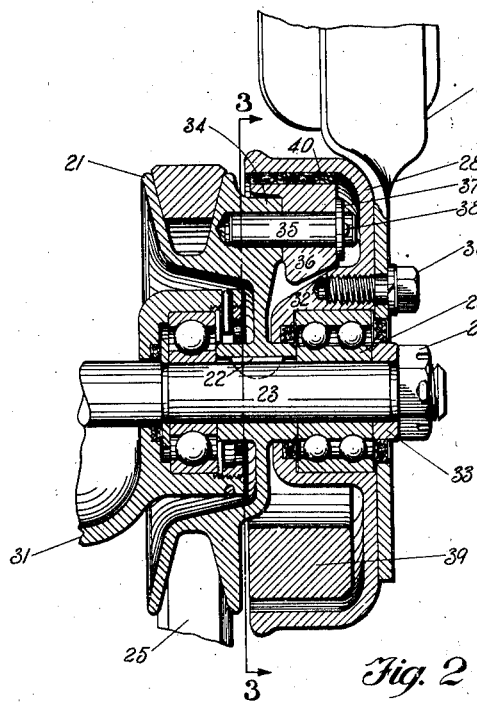
Figure 2 is an enlarged transverse section through the centrifugal fan shown in Figure 1 approximately as shown by the line 2—2 of Figure 3.
Figure 3:
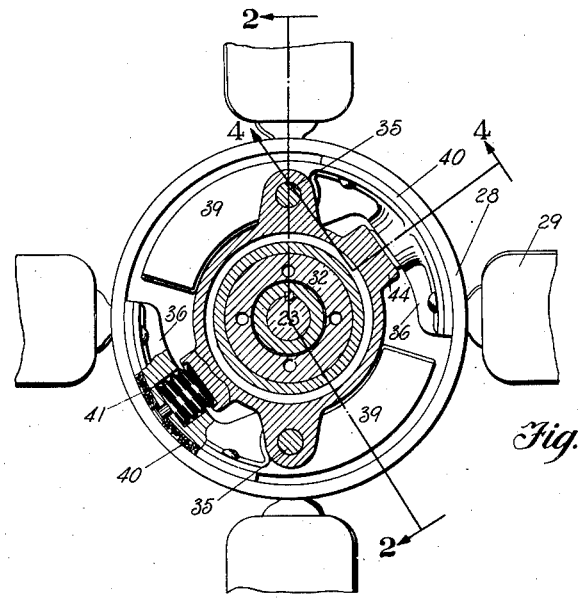
Figure 3 is a section through the fan taken on the line 3—3 of Figure 2.
Figure 4:
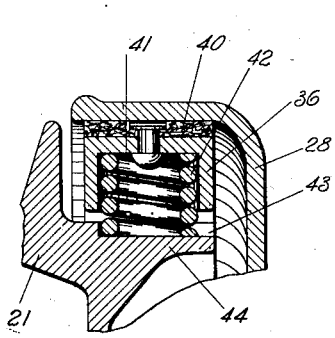
Figure 4 is a section taken on line 4—4 of Figure 3 showing the means for retaining the spring which normally holds the pivoted arm in engagement with the fan drum.
Figure 5:
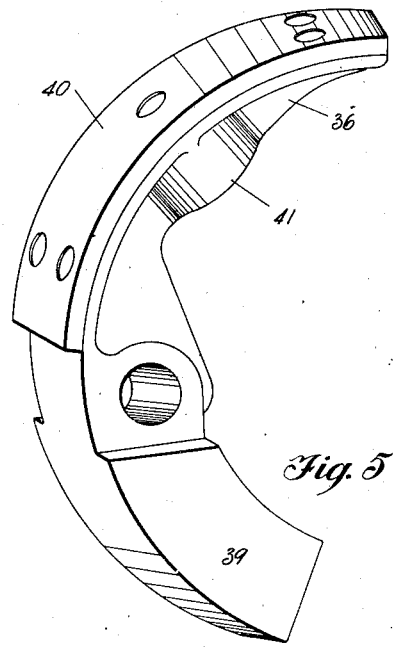
Figure 5 is an enlarged perspective view of one of the driving arms.

The fan pulley 21 is provided with oppositely disposed bosses 34 at opposite sides of the hub thereof which receive pivot pins 35 as shown in Figures 2 and 3. A pair of arms 36 are pivoted between their ends on these pins 35 and are held against longitudinal movement relative to the pins by washers 37 and cotter pins 38. Each arm 36 is provided with a weight 39 at one end formed integral therewith and with brake friction facing 40 riveted or otherwise secured to the arcuate outer surface of the other end thereof. The last mentioned end of the arm 36 is formed with a circular depression 41 in its inner face which receives one end of a coil spring 42. The other end of the coil spring 42 seats within a depression 43 in a shoulder 44 formed integral with the web of the fan pulley 21. The spring 42 is made of the proper size so that the compression force therein exerts pressure against the unweighted ends of the arm 36 to engage the friction facing 40 with the drum 28. The fan pulley 21, being connected by the belt 25 to the pulley 24, is continuously driven by the engine 20 at all speeds thereof. As the springs 42 force the arms 36 into contact with the drum 28 through their friction facings 40, the fan 29 rotates with the fan pulley 21. If the speed of the engine 20 having the maximum speed previously described is increased to 2000 revolutions per minute, centrifugal forces are set up in the weighted ends 39 of the arms 36 which are rotating with the fan pulley 21. These centrifugal forces cause the weighted ends 39 to move outwardly about the pivot pins 35 as axes which movement pivots the arms 36 on the pins 35. This throws the unweighted ends of the arms 36 out of engagement with the drum 28 to allow the fan blades 29 to rotate upon the shaft bearing 26 independently thereof. The air passing through the radiator when the vehicle is running at this speed (forty-five miles per hour) is sufficient to cool the engine 20. The weighted arms 36 remain out of contact with the drum 28 at an engine speed of 2000 revolutions per minute or at any speed above 2000 revolutions per minute and the fan will not be positively driven by the engine 20 until the speed of the engine falls below 2000 revolutions per minute. As soon as the speed of the engine falls below 2000 revolutions per minute, the centrifugal forces decrease and are overcome by the pressure in the springs 42, and the springs force the weighted ends 39 of the arms 36 to move inwardly and cause the arms 36 to again engage the drum 28 so that the fan 29 will be driven by the engine 20 to provide positive cooling at any speed below 2000 revolutions per minute.

It is to be understood however, that the engine speed of 2000 revolutions per minute has been taken only as an example and that the fan can be made to cut in or out at any desired speed which of course, is determined by the specifications of the springs 42. It is readily apparent that many advantages are derived by using a fan of this construction. It is seen that a great saving in the horsepower is gained, that is, the engine will have more available horsepower to use above the speed that the fan is cut out which can be used toward greater economy and efficiency. The fan is operated only at such speeds that it will not be noisy and will not tend to break the fan belt. Also, the fan is operated at the engine speeds where fan cooling is necessary and not at the speeds where cooling of the engine can be obtained by the wind passing through the radiator.

Formal changes may be made in the invention described without departing from the spirit and substance of the broad invention, the scope of which is commensurate with the appended claims.

What I claim is:

1. In an internal combustion engine, a fan, a drum secured thereto, driving mechanism therefor, and a friction clutch comprising weighted arms supported by said driving means contacting with said drum to rotate said fan.

2. In an internal combustion engine, a fan, a drum secured thereto, driving mechanism therefor, and a friction clutch controlled by the speed of said driving mechanism comprising weighted arms mounted within said drum pivoted between their ends to said driving means and contacting with said drum to drive said fan.

3. In an internal combustion engine, a fan, a drum secured thereto, driving mechanism therefor, and a centrifugally actuated friction clutch comprising weighted arms pivotally supported between their ends on said driving mechanism, certain of the ends of said arms being normally in contact with said drum, the others of said ends being acted upon by centrifugal forces to move said first mentioned ends out of engagement with said drum at a predetermined speed of said engine.

4. In an internal combustion engine, a cooling fan, a drum secured thereto, driving mechanism therefor, and weighted arms pivotally supported intermediate their ends on said driving means to rotate therewith, certain of the ends of said arms normally being in frictional engagement with said drum and the others of said ends being acted upon by centrifugal forces set up by the rotation of said driving mechanism to move said first mentioned ends out of contact with said drum at a predetermined speed of said engine.

5. In an internal combustion engine, a cooling fan, a drum secured thereto, a driving mechanism therefor, weighted arms pivoted between their ends to said driving mechanism contacting with said drum, and spring means normally holding said arms in frictional engagement with said drum.

6. In an internal combustion engine, a cooling fan, a drum secured thereto, a driving mechanism therefor, weighted arms mounted within said drum pivotally supported intermediate their ends on said driving mechanism, and springs interposed between said driving mechanism and certain of said ends for normally holding the same in contact with said drum, the others of said ends being moved outwardly by centrifugal forces against the pressure of said springs to disengage said first mentioned ends of said arms with said drum at a predetermined speed of said engine.

7. In an internal combustion engine, a cooling fan, a driving mechanism therefor, and means for disconnecting said fan from said driving mechanism at a predetermined speed of said engine, said means comprising a drum secured to said fan, arcuate arms mounted within said drum pivotally supported by said driving means to rotate therewith, spring means normally holding said arms in engagement with said drum, and weights secured to said arms at one side of the pivot points thereof, said weights being acted upon by centrifugal forces at said predetermined speed of said engine to pivot said arms out of engagement with said drum.

8. In an internal combustion engine, a rotatable shaft, a cooling fan freely rotatable upon said shaft, a driving mechanism therefor secured to said shaft, and means for disconnecting said fan from said driving mechanism at a predetermined speed of said engine comprising a pair of arcuate arms mounted within said drum pivotally supported intermediate their ends on said driving mechanism, said arms being provided with friction facing on certain of the ends thereof and integral weights at the other of said ends, and coil springs normally holding said arms in engagement with said drum, said weighted ends of said arms being acted upon by centrifugal forces at said predetermined engine speed to move said friction faced ends of said arms out of engagement with said drum.

Signed by me at South Bend, Indiana this 17th day of February, 1928.
DELMAR G. ROOS.